United States Patent [19]
Bhuta et al.

[11] 3,836,950
[45] Sept. 17, 1974

[54] ACOUSTO-OPTICAL MULTI-CONSTITUENT FLOW MONITORING METHOD AND APPARATUS

[75] Inventors: Pravin G. Bhuta; Robert L. Johnson; Douglas J. Graham; Robert Aprahamian, all of Los Angeles, Calif.

[73] Assignee: TRW Inc., Redondo Beach, Calif.

[22] Filed: July 26, 1972

[21] Appl. No.: 275,175

Related U.S. Application Data

[63] Continuation of Ser. No. 16,744, March 5, 1970, abandoned.

[52] U.S. Cl............. 340/5 H, 340/5 I, 331/94.5 A, 178/7.5, 332/7.51, 73/67.5 H
[51] Int. Cl............................................. G01v 13/00
[58] Field of Search............ 340/5 H, 5 I; 332/7.51; 178/7.5; 331/94.5 A; 73/67.5 H

[56] References Cited
UNITED STATES PATENTS

| | | | |
|---|---|---|---|
| 2,832,214 | 4/1958 | Trommler | 340/5 H |
| 3,424,906 | 1/1969 | Korpel | 332/7.51 |
| 3,431,504 | 3/1969 | Adler | 332/7.51 |
| 3,434,339 | 3/1969 | Stetson et al. | 340/5 H |
| 3,488,438 | 1/1970 | Rorpel | 340/5 I |
| 3,493,073 | 2/1970 | Wolfe et al. | 340/5 I |

*Primary Examiner*—Maynard R. Wilbur
*Assistant Examiner*—N. Moskowitz
*Attorney, Agent, or Firm*—Daniel T. Anderson; Donald R. Nyhagen; Jerry A. Dinardo

[57] ABSTRACT

An acousto-optical method and apparatus for monitoring individual constituents of differing acoustical transparency in a multi-constituent flow through a conduit. The conduit is acoustically coupled to an external acoustic source of fixed frequency and an external acoustic wave transmission medium in a manner such that acoustic wave energy from the source is transmitted laterally through a section of the conduit into the acoustic medium to produce within the medium distorted acoustic waves containing information representing each constituent present within the conduit section. This acoustic information is transformed to equivalent light information by a light-sound wave interaction yielding a light sideband which may be optically processed to image the constituents or converted to an electrical output representing the constituents.

6 Claims, 8 Drawing Figures

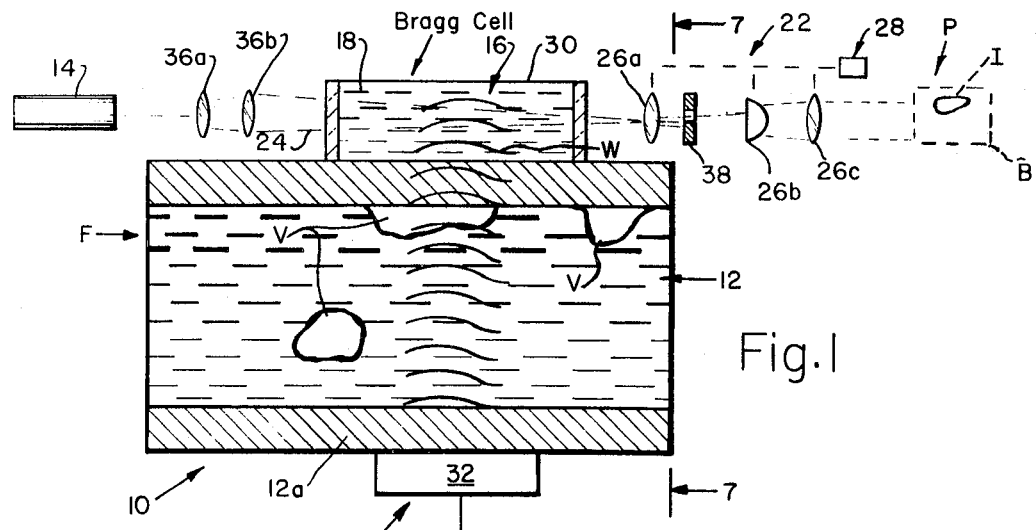
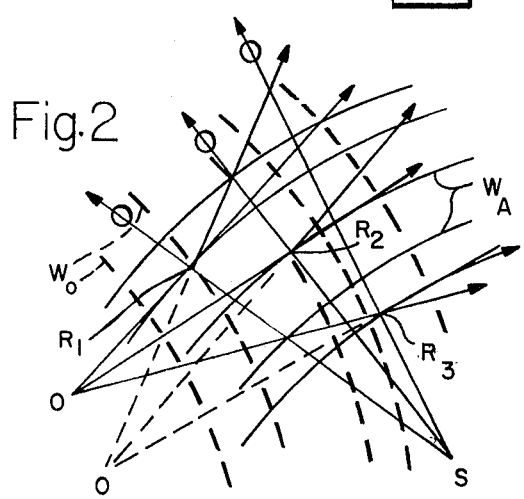
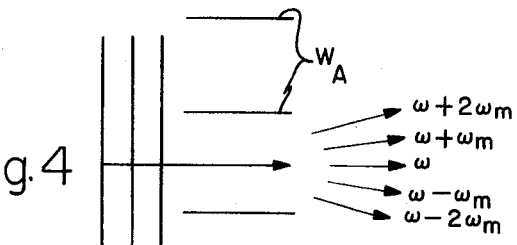
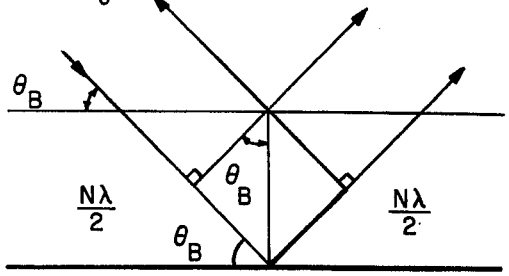
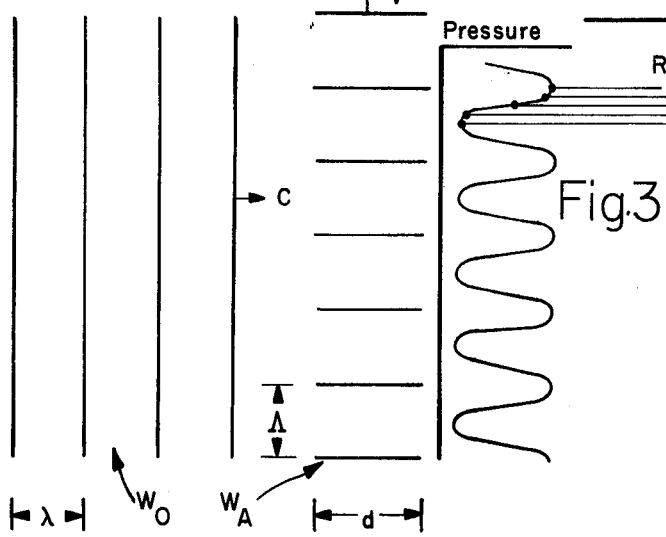
Fig.1
Fig.2
Fig.3
Fig.4
Fig.5
Robert L. Johnson
Douglas J. Graham
Robert Aprahamian
Pravin G. Bhuta
INVENTORS
BY
*Donald R. Nyhagen*
ATTORNEY Robert L. Johnson
Douglas J. Graham
Robert Aprahamian
Pravin G. Bhuta
*INVENTORS*

BY
*Donald R. Nyhagen*
ATTORNEY

ACOUSTO-OPTICAL MULTI-CONSTITUENT FLOW MONITORING METHOD AND APPARATUS

This is a continuation, of application Ser. No. 16,744, filed Mar. 5, 1970 and now abandoned.

RELATED APPLICATION

Reference is made herein to copending application Ser. No. 803,291, filed Feb. 28, 1969 and entitled "Acousto-Optical Method and Apparatus".

BACKGROUND OF THE INVENTION

1. Field of the Invention

This invention relates generally to the field of technology, referred to as acousto-optics, which involves the transformation of acoustic wave energy to equivalent light wave energy by the interaction of light waves with acoustic waves. More particularly, the invention relates to a novel acousto-optical method of an apparatus for monitoring individual constituents of different acoustical transparency in a multi-constituent flow through a conduit.

2. Prior Art

As will appear from the ensuing description, the present acousto-optical method and apparatus may be employed to monitor the individual constituents in a variety of multi-constituent flows including both single phase multi-constituent flows, such as multi-liquid flows, or multi-phase flows. The invention will be disclosed in connection with its use as a void fraction metering method and apparatus for monitoring the gas phase or void fraction in a two-phase in which which one constituent is a liquid and the other a gas or vapor.

It is well-known that the transport properties of two-phase flows are extremely erratic and hence, for the most part, uncontrollable. Because of the high order of magnitude of changes in the heat transfer coefficient and density between liquids and gases, for example, two-phase flow in boiling water reactors and cryogenic systems must be avoided. A device which detects or measures the gas phase or void fraction in an otherwise purely liquid flow at a selected station point is thus extremely advantageous if not absolutely essential in many applications, such as those listed above. In many of these applications, such a void fraction monitoring device must be capable of detecting two-phase flow in hazardous fluids, such as liquid oxygen and hydrogen, contained within an optically opaque fluid conduit.

A variety of void fraction monitoring or metering devices have been devised. Three of the more widely used void fraction meters, for example, are x-ray meters, capacitance meters, and sampling devices which permit periodic extraction of a sample of liquid flowing through a conduit for subsequent measurement of the void fraction of the sample. These existing void fraction meters, however, are characterized by certain inherent disadvantages. The x-ray meters and capacitance meters, for example, present a distinct safety hazard and require substantial electrical power for their operation. The sampling devices, on the other hand, are quite complex, do not permit continuous metering of the void fraction of the liquid flow, and are time consuming to operate.

The present invention provides an improved void fraction monitor or meter and monitoring or metering method which overcome these and other disadvantages of the existing void fraction metering techniques and meters. The present void fraction meter and metering method involve the acousto-optical imaging techniques disclosed in the aforementioned copending application Ser. No. 803,291.

As noted in the copending application, one of the known techniques of examining objects, which may be optically opaque, involves an acousto-optical imaging technique known as ultrasonic imaging. According to this technique, the object to be examined is acoustically coupled to an acoustic wave transmission medium and is then impinged by acoustic wave energy. The object scatters or distorts the incident acoustic wave energy in a manner such that the wave energy emerging from the object into the acoustic medium produces within the medium distorted acoustic waves containing information describing or defining an image of the object. This acoustic wave information is converted or transformed into an optical image of the object by means of an electrical ultrasonic image converter. Ultrasonic imaging systems of this type are well-known in the art and have been described in various prior art publications. One of these publications is in the National Academy of Sciences, Report No. NRG-MAC-2016, entitled "Ultrasonic Imaging" by R. S. Mackay et al.

The primary advantage of ultrasonic imaging over conventional optical imaging resides in its ability to image the interior of optically opaque objects. This capability stems from the fact that the acoustic energy utilized in ultrasonic imaging penetrates and is scattered or distorted by optically opaque materials in much the same say as light waves penetrate and are scattered by optically transparent materials. As a consequence, the distorted acoustic wave energy emerging from an optically opaque object contains information defining each interior point of the object in much the same way that the light waves transmitted through an optically transparent object contain information defining each interior point of the transparent object. In a conventional optical imaging system, the distorted light waves emerging from the object are focused by a suitable optical system to image the object. In the existing ultrasonic imaging systems, on the other hand, the distorted acoustic waves emerging from the object are converted to an optical image of the object by an electronic ultrasonic image converter.

The electronic image converter has a cathode-ray tube on which the image is produced. The object to be examined is placed within an acoustic wave coupler containing an acoustic wave transmission medium, such as water. Acoustic wave energy is then transmitted through the object into the acoustic medium. During passage of the acoustic waves through the object, the waves are scattered or distorted by each point of the object in such a way that each such point becomes, in effect, a separate acoustic point source. The acoustic waves emanating from these separate point sources combine to produce in the acoustic medium the distorted acoustic waves describing or defining the object image. These distorted acoustic waves pass through an acoustic lens which focuses the distorted acoustic wave energy upon an extended area of piezoelectric material which is scanned by an electron beam to generate a fluctuating electrical signal corresponding to the acoustic image information incident on the piezoelectric material. The fluctuating electrical signal from the piezoelectric detector is applied to a cathode-ray tube to produce on the face of the tube an optical image of the object.

Such electronic ultrasonic image conversion systems are quite complex and costly and suffer from various other disadvantages which need not be elaborated on here. Suffice it to say that the present invention seeks to overcome these disadvantages by utilizing the interaction of light waves with the distorted acoustic waves from the object being examined to convert the emerging distorted acoustic wave image information to an observable optical image of the object or to some other useful output.

The basic principle and mechanics of light-sound wave interaction has been recognized and studied for a number of years. By way of example, the results of some of these studies are contained in the following references:

1. Debye, P. And Sears, F. W., Proc. National Academy of Science, Washington, 18, (1932), p. 409.
2. Adler, R., "Interaction Between Light and Sound", IEEE Spectrum, p. 42, May 1967.
3. Korpel, A., "Visualization of the Cross Section of a Sound Beam by Bragg Diffraction of Light", Applied Physics Letters, Vol. 9, No. 12, December 1966.

Another prior art publication dealing with the interaction of light and sound waves is the Adler U.S. Pat. No. 3,373,380. This patent discloses an acousto-optical system which utilizes light-sound wave interaction to transform an electrical signal into an equivalent light signal.

Generally speaking, the basic technique of light-sound wave interaction involves the generation of acoustic waves within an acoustic wave coupler, sometimes referred to as a Bragg cell, containing an acoustic wave transmission medium. A beam of monochromatic light is transmitted through this acoustic medium transverse to the propagation vector of the acoustic waves through the medium in a manner such that the light wavefronts impinge the acoustic wavefronts. The light wavefronts are diffracted and modulated by the acoustic waves in such a way that the refracted light waves emerging from the medium produce a light field which is modulated in accordance with the acoustic imput of the wave coupler.

In the acousto-optical signal translation system disclosed in the Adler patent, an acoustic transducer is mounted on one end of the wave coupler and is energized by the electrical signal to be translated or converted into a light signal. This electrical signal may be amplitude or frequency modulated. When thus energized, the transducer generates within the wave transmission medium of the wave coupler acoustic waves which fluctuates in frequency or amplitude according to the modulated electrical signal impressed on the transducer. The light source of the Adler system is a laser whose collimated beam of spatially coherent monochromatic light is directed through the wave coupler to a following projecting telescope. This telescope focuses the refracted light waves emerging from the wave coupler onto a light sensitive medium to produce a concentrated light field or spot on the medium. During passage of the light-beam through the wave coupler, the light waves are modulated by the acoustic waves, thus causing the intensity of the light-spot to fluctuate in accordance with the modulation of the transducer input signal. The primary contribution of the Adler system resides in its organization whereby the light waves impinge the acoustic waves approximately at the Bragg angle to yield an optimum light output signal. This organization involves, in part, precise orientation of the laser axis at the Bragg angle relative to the propagation vector of the acoustic waves through the wave coupler.

The invention disclosed in the copending application involves a novel acousto-optical imaging method and apparatus embodying an improved technique for converting or transforming to an optical image or other useful output, the distorted acoustic wave information resulting from transmission of acoustic wave energy of fixed frequency through an object into an acoustic wave transmission medium. This transformation of the distorted acoustic wave information to equivalent light information is accomplished directly by a light-sound wave interaction rather than indirectly with the aid of an electronic ultrasonic image converter. Such light-sound wave interaction produces a number of light sidebands, one of which, preferably a first order sideband, is magnified to produce an optical image of the object or otherwise processed to provide usable output information corresponding to the acoustic information represented by the distorted acoustic waves.

More specifically, transformation or conversion of the distorted acoustic wave information to equivalent light information, such as an image of the object, is accomplished by directing a beam of monochromatic light through the acoustic medium, transverse to the propagation vector of the acoustic waves through the medium. The wavefronts of light impinge the traveling distorted acoustic wavefronts within the medium at an oblique angle, preferably the Bragg angle. The light waves are modulated and refracted by the distorted acoustic waves in a manner which produces light sidebands each defining an optical image of the object. One sideband, preferably a first order sideband, is magnified by an appropriate optical system to produce an observable image of the object, or otherwise converted to an output representing the image.

SUMMARY OF THE INVENTION

The present invention utilizes the acousto-optical imaging technique of the copending application to monitor individual constituents of differing acoustic transparency of a multi-constituent flow within a fluid conduit which may be optically opaque. As noted earlier, the invention is disclosed in connection with monitoring or metering the gas phase or void fraction in a two-phase flow. This is accomplished by locating the acoustic source and acoustic wave transmission medium in acoustically coupled relation to the conduit in a manner that acoustic wave energy from the source is transmitted through the conduit and the two-phase flow to the acoustic medium. The resulting distorted acoustic waves produced in the acoustic medium contain acoustic information representing an image of the two-phase flow and its contained gas voids. This acoustic information is converted to equivalent light information by the light-sound wave interaction of the copending application to yield refracted light rays defining an image of the gas voids within the two-phase flow. According to the present invention, these selected rays may be optically processed to produce an optical image of the gas voids from which the void fraction of the two-phase flow may be estimated. Alternatively, the selected emergent refracted light rays may be detected by a photocell and converted to an electrical output representing the void fraction. The same procedure is followed with other multi-constituent flows.

BRIEF DESCRIPTION OF THE DRAWINGS

In the drawings:

FIG. 1 diagrammatically illustrates an acousto-optical multi-constituent flow monitoring instrument, in this case a void fraction meter, according to the invention;

FIG. 2 depicts the basic acousto-optical imaging principle utilized in the invention;

FIG. 3 depicts an enlarged portion of FIG. 2 as well as certain acoustic pressure variations which are involved in the acousto-optical imaging technique;

FIG. 4 depicts the so-called Sears-Debye condition;

FIG. 5 depicts certain constructive interference of light waves by a defraction grating;

DESCRIPTION OF THE PREFERRED EMBODIMENTS

Figure 6:
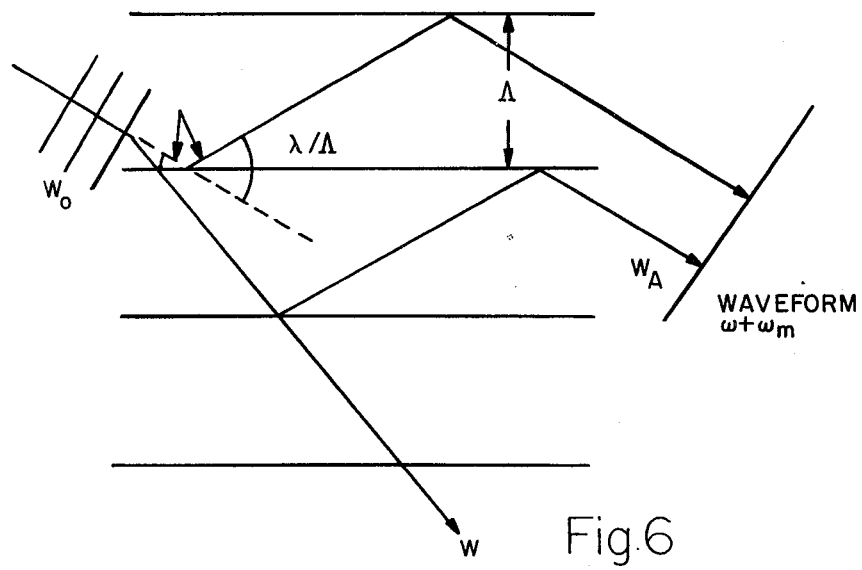
FIG. 6 depicts constructve light interference as it occurs in acousto-optical imaging.

Turning first to FIG. 1 of these drawings, there is illustrated an acousto-optical multi-constituent flow monitoring instrument 10 according to the invention. The particular instrument shown is a void fraction meter for monitoring or measuring the gas phase or void fraction of a two-phase flow within a fluid conduit 12 which may be optically opaque but is relatively acoustically transparent. In general terms, the meter comprises a monochromatic light source 14, a wave coupler or Bragg cell 16, which is transparent to the light from the source 14 and embodies an acoustic wave transmission medium 18, an acoustic energy source 20, and an optical system 22. At this point, it should be noted that as used in the present disclosure, the terms "light", "sound", "acoustic waves", and other similar expressions, are most general. That is to say, the term "light" refers to both visible and invisible electromagnetic radiation and embraces wave energy at wavelength either within, above, or below the visible portion of the electromagnetic spectrum. Similarly, the terms "sound" and "acoustic waves" encompass all acoustic wave frequencies including subaudible, audible, and ultrasonic frequencies.

The conduit 12, acoustic medium 18, and acoustic source 20 are acoustically coupled in such a way that acoustic wave energy is transmitted from the acoustic source through a section 12a of the conduit to the acoustic medium. The acoustic waves from the source are distorted or scattered by the gas voids V in the two-phase fluid F within the conduit section 12a and produce within the acoustic medium distorted acoustic waves W. A light-beam 24 from the light source 14 is transmitted through the acoustic medium 18, transverse to the propagation vector of the acoustic waves through the medium. The light wavefronts of the light-beam impinge the wavefronts of the distorted acoustic waves within the acoustic medium and are modulated and refracted in the manner hereinafter explained. In this regard, it will become evident from the ensuing description that refraction of the light waves occurs because of the variations in the density of the acoustic medium across the acoustic waves resulting from the acoustically induced pressure variations which constitute the acoustic waves. The light wavefronts impinge the distorted acoustic wavefronts at an oblique angle, preferably the Bragg angle, such that the light emerging from the acoustic medium is composed of refracted light rays or light sidebands which define optical images of the gas voids V in the conduit section 12a.

The light sidebands emerging from the acoustic medium 18 may be utilized in various ways, depending upon the form of output information desired. In FIG. 1, the sidebands pass through the optical system 22 which isolates and magnifies a selected sideband to produce in an external viewing plane P an observable image I of the gas voids V in the path of the acoustic waves. The optical system may be equipped with a focus adjustment 28 for focusing the optical system in any selected cross-sectional plane of the conduit section 12a so as to image this selected plane in the external viewing plane P. The particular optical system shown is essentially a telescope optical system including a microscope objective 26a, a cylindrical magnifying lens 26b, and a final simple lens 26c.

It will be recalled from the earlier discussion that the phenomena of light-sound wave interaction and acoustic or ultrasonic imaging using an ultrasonic image converter have been known and studied for a number of years. Accordingly, it is unnecessary to elaborate in detail on these phenomena in the present disclosure. However, in the interest of a full and complete understanding with the present invention, it is deemed advisable to discuss briefly some of the principles involved in these phenomena.

First, consider the actions which occur when acoustic waves are transmitted through an object, such as the conduit 12, into an acoustic wave transmission medium. In the particular embodiment of the invention illustrated in FIG. 1, the acoustic medium 18 is a liquid, such as water, contained within a tank 30 which, together with the liquid, constitutes the wave coupler or Bragg cell 16. The acoustic medium 18 and the walls of the tank 30 are transparent to the light from the light source 14. The acoustic wave source or generator 20 comprises a transducer 32, such as a piezoelectric crystal, connected to a driver 34 which energizes the transducer at a fixed frequency. Bragg cell 16 and transducer 32 are acoustically coupled to diametrically opposite sides of the conduit 12 by placing the cell and transducer in contact with the conduit, as shown. It will be understood, therefore, that the acoustic source 20 generates acoustic waves of fixed frequency which are transmitted through the conduit 12 and its contained two-phase fluid F into the acoustic medium 18.

During their passage through the fluid F, the acoustic waves generated by the acoustic source 20 behave in much the same way as light waves passing through an optically translucent object. That is to say, the acoustic waves are distorted, i.e. defracted or scattered, at each point of discontinuity within fluid in such a way that each point effectively becomes a separate point acoustic source from which acoustic waves emanate. As a consequence, the acoustic wave energy emanating from the fluid into the acoustic medium 18 is effectively the sum or resultant of the acoustic waves from all of the separate point sources within the fluid and produces the distorted acoustic waves W. These distorted waves have a complex wave pattern which constitutes acoustic information describing or defining each acoustic point source.

According to the present invention, this acoustic information is transformed or converted into equivalent light information by the interaction of the wavefronts of the light-beam 24 with the distorted acoustic wavefronts within the acoustic medium 18. In the particular embodiment shown in FIG. 1, the light information is optically processed by the optical system 22 to produce within the viewing plane P an optical image I of the gas voids V in the two-phase fluid F. To understand this acousto-optical transformation or conversion, first consider FIG. 2, in which S is a point source of acoustic waves $W_A$ of fixed frequency within a surrounding acoustic wave transmission medium and O is a point source of monochromatic light waves $W_o$. In this figure, the acoustic waves and light waves are illustrated as curved lines which represent the traveling acoustic and light wavefronts. The light wavefronts impinge the acoustic wavefronts within the acoustic medium as depicted in the figure. Consider also FIG. 3, which represents a narrow incremental band or column of the acoustic waves and a narrow incremental band or column of the light waves in FIG. 2. As is well-known to those versed in the art and depicted in the graph at the righthand side of FIG. 3, the acoustic waves $W_A$ within the acoustic column constitute cyclic compression and rarefaction or relief zones within the acoustic wave transmission medium and include regions $R_1$ of maximum compression, regions $R_2$ of partial compression, regions $R_3$ of zero compression, regions $R_4$ of partial relief, and regions $R_5$ of maximum relief. The index of refraction of the acoustic medium is a function of its density, and its density in turn is a function of the pressure of the medium. It is evident, therefore, that the refraction index of the acoustic medium varies progressively across each acoustic wave. The propagation velocity C of the light waves $W_o$ through the acoustic medium is a function of the refraction index according to the equation $$C = C_o/\eta \qquad 1.$$

where
$C_o$ is the velocity of the light waves in air;
$\eta$ is the refraction index of the acoustic medium.
The propagation velocity of light waves through the acoustic medium thus varies across each acoustic wave.

During their passage through the acoustic wave transmission medium, the light waves also undergo a phase shift $\Delta\phi$. This phase shift is expressed by the equation $$\Delta\phi = [2 \pi d/\lambda_0] (\Delta\eta) \qquad 2.$$

where
$d$ is the width of the acoustic column;
$\lambda_0$ is the wavelength of the light waves in air;
$\Delta\eta = \eta - 1$ With this discussion in mind, consider the situation depicted in FIG. 3, wherein the light waves $W_o$ impact the column of acoustic waves $W_A$. Since the acoustic waves travel or propagate through the acoustic medium, the density of the medium and hence its refraction index at any given point along the acoustic column fluctuates in cyclic fashion between minimum and maximum values. As a consequence, the light waves $W_o$ are both frequency and phase modulated as they traverse the acoustic column. This modulation phenomena and its consequences are well-known. Thus, it is known that if a wave, i.e. a carrier wave, of frequency $\omega$ is modulated by a frequency $\omega_m$, a series of multiple waves or wave components is created including the original carrier wave of frequency $\omega$ and a set of sidebands whose frequencies differ by $\omega_m$ from one another and from the carrier frequency. In the particular situation depicted in FIG. 3, the light waves $W_o$ are modulated by the acoustic waves $W_A$ in such a way that the light emerging from the acoustic column will consist of a carrier component having the frequency $\omega$ of the incident light waves and sidebands of the order N with frequencies $\omega \pm N\omega_m$, where $\omega_m$ is the fixed frequency of the acoustic waves. It can be shown that these sidebands have oblique propagation vectors inclined at the angle $\phi$ relative to the carrier vector according to the equation $$\tan \phi = \pm N\lambda/\Lambda \qquad 3.$$

where
$\lambda$ is the wavelength of the light waves in the acoustic medium;
$\Lambda$ is the wavelength of the acoustic waves. In other words, the sidebands are uniformly dispersed through an angle equal to the ratio of the wavelength of the light waves to the wavelength of the acoustic waves.

It will be immediately recognized by those versed in the art that this sideband dispersion occurs instantaneously upon impact of the light waves with the acoustic column. As a consequence, a given sideband produced by impact of incident light waves on a compressed region of the acoustic column will eventually enter a relieved or rarefied region of the column. This may cause destructive interference and tend to extinguish the sideband. Such destructive interference of a selected sideband can be reduced by imposing the condition that the lateral spread of this sideband relative to the carrier propagation vector shall not be greater than one-half the width $d$ of the acoustic column. It can be shown that this condition requires $$d << \Lambda^2/2\lambda |N| \qquad 4.$$

where
$N$ is the order of the selected sideband, and the angular spread $\phi$ is small such that $\tan \phi \approx \phi$.

When this condition obtains, then, all of the sidebands of order N and lower order will experience no destructive interference, while all of the sidebands of higher order than N will experience a high degree or total destructive interference. This condition is the well-known Sears-Debye condition and is diagrammatically illustrated in FIG. 1. As will appear from the later description, the present acousto-optical imaging technique may be practiced in such a way that Sears-Debye condition is satisfied. This is hereafter referred to in places as practicing or operating in the Sears-Debye regime.

In addition to the above discussed phenomenon of destructive interference, light-sound wave interaction may also involve constructive interference of the light waves. Such constructive interference involves Bragg reflection. In this regard, it will be recognized by those versed in the art that the acoustic column in FIG. 3 constitutes, in effect, a traveling diffraction grating in which successive isopiestric planes of each acoustic wave $W_A$ effectively constitute successive grating strata. When a light wave impacts such a grating, the wave is reflected from the successive strata. Bragg's law defines the condition under which such a refraction grating will reflect an incident light wave with maximum intensity. More specifically, Bragg's law defines the condition under which the parts of the incident light wavefront which reflect from the successive grating strata will recombine in phase. When this condition obtains, constructive interference occurs, and the different parts of the reflected wavefront reenforce one another when they combine. FIG. 5 depicts the phenomena of Bragg reflection from two successive strata of a diffraction grating. With respect to this figure, Bragg's law of reflection is expressed mathematically as $$SIN\theta_B = N\lambda/2D \qquad 5.$$

where $\theta_B$ is the Bragg angle;
$N$ is an integer; and
$D$ is the grating distance.

Assume now the situation wherein the width $d$ of the acoustic column is greater than that prescribed in the Sears-Debye condition. In other words $$d << \Lambda^2/2\lambda |N| \qquad 6.$$

where the angular spread $\phi$ (equation 3) is small such that $\tan \phi \approx \phi$. The condition expressed by this equation is referred to as the Bragg condition. It can be demonstrated that when the Bragg condition exists, the light waves entering the acoustic column undergo reflection and refraction by the acoustic waves as well as constructive and destructive interference in such a way that the light emerging from the acoustic column will consist of the carrier and that sideband or those sidebands whose order N satisfy the Bragg equation (6) for the particular width $d$ of the acoustic column through which the light passes. All other sidebands will be cancelled by destructive interference. For example, assume $$d = \Lambda^2/2\lambda 2 \text{ (i.e. } N = 2) \qquad 7.$$

under these conditions, the only light sideband whose order N will satisfy the Bragg equation (6) is the first order so that the only light emerging from the column will be the carrier and the first order sidebands. If $$d = \Lambda^2/2\lambda 4 \text{ (i.e. } N = 4) \qquad 8.$$

the light emerging from the acoustic column can consist of the carrier and the first six sidebands whose orders N are ±1, ±2, and ±3, respectively, assuming light exists at those Bragg angles. In the ensuing description, practicing or operating under the conditions defined by the Bragg equation (6) is referred to in places as practicing or operating in the Bragg regime. It will become evident to those versed in the art that the present invention may be practical and operated within either the Sears-Debye regime or the Bragg regime. It will become further evident as the description proceeds, however, that maximum image intensity and definition are attained by operating in the Bragg regime. Accordingly, operation in this regime constitutes the preferred practice of the invention.

In this latter regard, it can be demonstrated that when operating in the Bragg regime, transmission of light waves through the acoustic column in such a way that the light waves impact the column at the Bragg angle for a selected light sideband whose order satisfies the Bragg equation (6) for that particular column, has two effects which are highly beneficial in the present acousto-optical imaging invention. One of these effects is that the selected sideband experiences constructive interference and hence reenforcement as it passes through the acoustic column, as depicted in FIG. 6. The other effect is that the remaining sidebands which do not satisfy the Bragg condition for the acoustic column undergo conversion or transformation to the order of the selected sideband. As a result, the light energy of the selected sideband emerging from the acoustic column represents a greater percentage of the total available light energy incident on the column. This greater light energy of the selected emerging sideband results in correspondingly increased image intensity.

With the foregoing discussion of light-sound wave interaction in mind, consider again the situation depicted in FIG. 2. It will be observed that the traveling light waves $W_o$ and the acoustic waves $W_A$ impinge or intersect one another at various angles as they propagate through the acoustic medium. From the preceding discussion, it will be understood that diffraction of the light waves by the acoustic waves occurs within all regions of the light-sound wave interaction zone and that maximum defraction occurs within those regions wherein the light waves impinge the acoustic waves at the Bragg angle corresponding to the wavelengths of the light and acoustic waves in the acoustic medium. These Bragg regions are designated in FIG. 2 as $R_1$, $R_2$, and $R_3$. If the refracted light rays from these Bragg regions are traced back or extended, it will be found that they intersect at point $O'$ and thus define a virtual image of the acoustic source S. Assume now a number of separate acoustic sources rather than a single source as depicted in FIG. 2. In this case, the acoustic waves from the several point sources combine to produce a resultant complex acoustic wave pattern containing information defining the several sources. The refracted light rays which emanate from the Bragg regions of the complex acoustic waves define multiple virtual images of the several acoustic sources. If the refracted light rays are focused in a viewing plane, real images of the acoustic sources will be produced in the image plane. It can be demonstrated that this imaging technique results in image magnification according to the equation $$M = \lambda/\Lambda \qquad 9.$$

This means if two point acoustic source $S_1$ and $S_2$ are separated by the distance $\overline{S_1 S_2}$, their images will be separated by the distance $M(\overline{S_1 S_2}) = \lambda/\Lambda (\overline{S_1 S_2})$.

The present invention utilizes the above discussed phenomena of light-sound wave interaction and acousto-optical imaging to produce the gas void image I in FIG. 1. In this regard, it will be recalled from the earlier discussion that the acoustic waves from the acoustic source 20 are transmitted through the two-phase fluid F into the acousto-wave transmission medium 18. During their passage through the fluid, the acoustic waves are scattered or distorted at each point of discontinuity within the fluid, that is at each boundary point between the liquid and gas phases within the fluid, because of the acoustic impedance mismatch between the liquid and gas. Each such point thus becomes, effectively, a separate point acoustic source. The acoustic waves from these separate point sources combine to produce the column of distorted acoustic waves W which emanate from the fluid into the acoustic medium and interact with the light waves from the light source 14. As explained below, this light source is preferably arranged to induce Bragg reflection of the light-beam 24 from each of the distorted acoustic waves propagating through the acoustic medium 18. The light which emerges from the acoustic medium is composed of the light carrier frequency and two or more light sidebands, depending upon the various factors discussed earlier. Each emerging sideband contains information defining each point in the two-phase fluid F and hence an image of the gas voids V in the fluid. The emerging light waves pass through the optical system 22 which magnifies the light rays of a selected emerging sideband to produce in the viewing plane P an observable image I of the gas voids. The focusing means 28 may be adjusted to image within the viewing plane P any selected cross-sectional plane of the fluid stream along the conduit section 12a.

It will be understood by those versed in the art that the light utilized in the present acousto-optical void fraction meter is monochromatic light. In the particular inventive embodiment illustrated, for example, the light source 14 comprises a laser source. It will be further evident that Bragg reflection of the monochromatic light waves from the distorted acoustic waves emanating from the object 12 into the acoustic medium 18 requires impact of the distorted acoustic wavefronts by the light wavefronts at the correct oblique angle of incident, i.e. the Bragg angle. According to the disclosure in the earlier mentioned Adler patent, such Bragg reflection is accomplished by using a laser light source having its propagation axis oriented at the Bragg angle relative to the propagation vector of the acoustic waves through the acoustic medium. This particular method of achieving Bragg reflection has two disadvantages. First, because the laser beam is collimated, Bragg reflection would occur at only a relatively small number of points of each acoustic wavefront, thus resulting in an image of poor quality. In other words, the laser beam is composed of parallel light rays all of which would impact the column of distorted acoustic waves W at the same angle relative to the propagation vector of the acoustic waves in the column. As a consequence, Bragg reflection of the light rays from the acoustic wavefronts would occur only at those relatively few points, i.e. Bragg regions, where the local acoustic wavefront region is oriented at the Bragg angle relative to the propagation vector of the laser beam. Stated another way, a particular local acoustic wavefront region, to constitute a Bragg region, must be oriented precisely at the Bragg angle relative to the laser beam axis. Secondly, the Adler technique requires precise orientation of the laser axis relative to the propagation axis of the acoustic waves through the acoustic medium 18. This precise orientation is extremely difficult to both obtain and maintain.

The stated disadvantages of the Adler technique of achieving Bragg reflection are avoided in the void fraction meter of FIG. 1 by utilizing a tapered light-beam, such as the illustrated convergent beam 24, composed of non-parallel light rays which impact the column of distorted acoustic waves W through a range of angles related to the taper angle of the light-beam. In this case, for a particular local acoustic wavefront region to constitute a Bragg region for effecting Bragg reflection of the incident light-beam, it is only necessary that the angular attitude of that region, relative to the propagation axis of the light-beam, fall within a range of angles equal to the taper angle of the light-beam. In other words, any local acoustic wavefront region whose angle relative to the light-beam axis falls within this angular range will provide a Bragg region at which Bragg reflection will occur as the wavefront travels through the light-sound wave interaction zone. As a consequence, the present tapered light-beam results in Bragg reflection at a relatively large number of points or regions of the distorted acoustic wavefronts W and produces a relatively high quality image.

Such a tapered light-beam may be obtained in various ways. FIG. 1 illustrates one method. In this case, the collimated light-beam emerging from the laser light source 24 passes through a first diverging lens 36a which spreads the beam to divergent conical beam. Following the diverging lens is a converging lens 36b which condenses the divergent beam to the convergent conical beam 24. Convergent light-beam 24 passes through the wave coupler or Bragg cell 16 and in the absence of any acoustic wave disturbance or other disturbance in the acoustic medium would emerge from the coupler as a single beam which would come to focus at a point beyond the coupler.

During operation of the acousto-optical system 10, the convergent light-beam 24 interacts with the distorted acoustic waves W traveling through the acoustic medium as discussed earlier. From this earlier discussion, it is evident that the light which then emerges from the wave coupler or Bragg cell 16 is composed of the light-beam carrier and light sidebands whose number and order will depend on the width of the acoustic column and the angles at which the light rays of the convergent beam impact the acoustic column. It is further evident that each light sideband produced by the light-sound wave interaction has its own Bragg angle. If the taper or cone angle of the light-beam is relatively large, the rays of the beam will impact the acoustic column at the Bragg angles for a number of different light sidebands. Under these conditions, these several sidebands will experience constructive interference, and the remaining sidebands which do not satisfy the Bragg equation (6) will undergo transformation to the sidebands whose Bragg angles of reflection fall within the light-beam angle. As a consequence, several light sidebands would emerge from the wave coupler 16, and the light energy in each emerging sideband, which is the light energy available for imaging, would represent a correspondingly reduced fraction of the total available light energy from the light source. According to the preferred practice of the invention, the taper or cone angle of the light-beam is made sufficiently small to encompass the Bragg angle of reflection of the first order sidebands only. Under these conditions, higher order sidebands will not be formed and more light is available for formation of the first order sidebands. As a consequence, the light energy of each first order sideband emerging from the wave coupler 16 and available for imaging will represent a relatively large fraction of the total available energy of the light source, and the intensity of the resulting image will be correspondingly increased.

The light emerging from the Bragg cell 16 passes first through the diverging lens 26a which spreads the emerging first order light sidebands. Since only one of the emerging first order sidebands is used for imaging, it is desirable to blackout the light-beam carrier and the other emerging first order sideband. This is accomplished by placing an apertured opaque mask 38 behind the lens 26a in such a way that the mask intercepts the light-beam carrier and one first order sideband. The remaining sideband passes through the aperture in the mask to produce in the viewing plane P the observable image I of the voids V.

Figure 7:
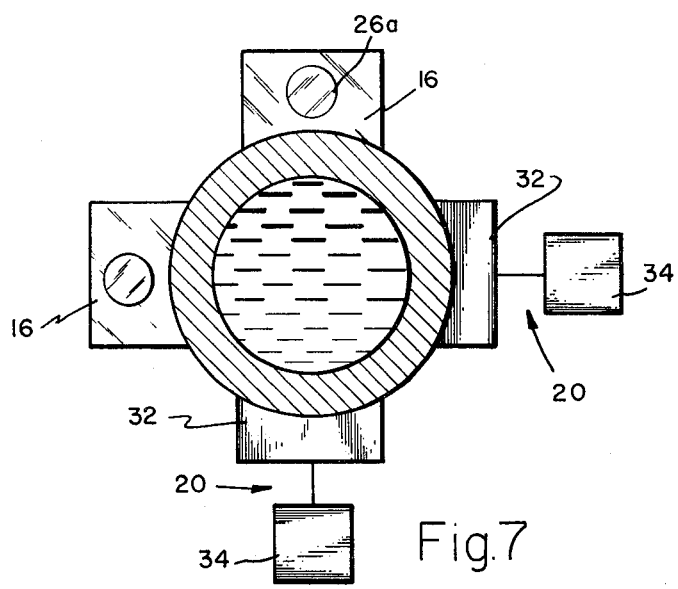
FIG. 7 is a section taken on line 7—7 in FIG. 1.

The void fraction meter of FIG. 1 may be used to merely detect two-phase flow through the conduit 12, by detecting the presence of gas voids in the flow stream. Alternatively, the meter may be employed to measure the void fraction of the two-phase flow at any given instant. Such measurement may involve a simple estimation of the void fraction from visual observation of the void image or a photograph of the image. According to an alternative estimating procedure, the void image may be photographed and the void image size measured to permit a more accurate estimation of the void fraction. Of significance in connection with the above void fraction estimation technique is the fact that the void image is produced against contrasting background B which is effectively an image of the transducer 32. Since the area of the transducer relative to the cross-sectional area of the conduit 12 and the total void area of the void image I relative to the transducer image B may be determined by measurement, the fraction of the conduit cross-section occupied by the void image may be also determined to obtain a relatively accurate measurement of the void fraction within the conduit section 12a. For more precise measurement, the present void fraction meter may be equipped with a pair of acousto-optical imaging systems arranged at right angles relative to one another, as shown in FIG. 7. This permit a more accurate judgment of the shape of the voids within the two-phase flow stream and hence the void fraction.

Figure 8:
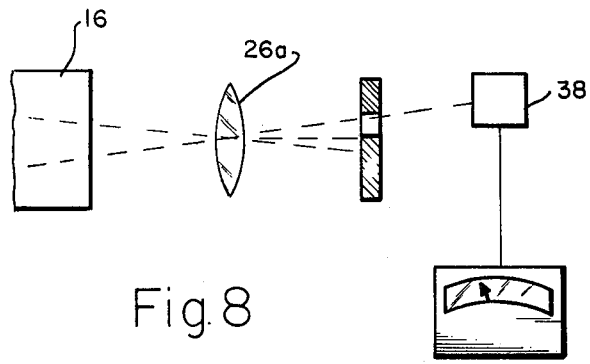
FIG. 8 illustrates a modified acousto-optical void fraction meter according to the invention.

As shown in FIG. 8, the lenses 26b and 26c in the optical system 22 of FIG. 1 may be replaced by a light detector 102, such as a photocell, positioned directly behind the aperture in mask 38. The output of this photocell is connected to an electrical meter or recorder 104. In this case, the emergent light sideband from the mask 38, which defines the void image I in FIG. 1, impinges the photocell 102. The intensity of this light sideband, and hence the photocell output, varies in relation to the total effective image area of the void image defined by the sideband. Accordingly, the meter or recorder 104 may be calibrated to readout the instantaneous void fraction of the two-phase flow within the conduit 12.

As noted earlier, the invention may be utilized to monitor individual constituents of differing acoustical transparency in any multi-constituent flow, including single phase multi-constituent flows and multi-phase flows.

We claim:

1. The acousto-optical method of monitoring individual constituents of differing acoustical transparency in a multi-constituent flow within a conduit, which comprises the steps of:

locating an acoustic source of given frequency and an acoustic wave coupler containing an acoustic wave transmission medium in acoustically coupled relation with opposite sides of a section of said conduit;

transmitting acoustic wave energy from said acoustic source through said conduit section to said acoustic medium to produce in said medium distorted acoustic waves containing acoustic information representing the local constituents within said conduit section;

projecting a beam of monochromatic light through said acoustic medium in a manner such that said beam is modulated by said distorted acoustic waves to produce a selected light sideband defining an optical image of said local constituents;

magnifying said visible image; and providing a visible reference area of known relationship to the cross-sectional flow area of said conduit section and on which said magnified image is superimposed, whereby a selected constituent fraction may be estimated.

2. The acousto-optical method of monitoring individual constituents of differing acoustical transparency in a multi-constituent flow within a conduit, which comprises the steps of:

locating a pair of acoustic sources of given frequency and a pair of acoustic wave couplers containing an acoustic wave transmission medium in acoustically coupled relation with a section of said conduit in a manner such that said acoustic sources are spaced circumferentially about said conduit section and said wave couplers are located opposite said sources, respectively;

transmitting acoustic wave energy from each acoustic source through said conduit to the acoustic medium in the opposing acoustic coupler to produce in each medium distorted acoustic waves containing acoustic information representing the local constituents within said conduit section; and projecting a beam of monochromatic light through each acoustic medium in a manner such that said beam is modulated by the distorted acoustic waves in the respective medium to produce a selected light sideband defining an optical image of said local constituents.

3. The acousto-optical method of claim 2 including the additional steps of:

magnifying each image; and providing a visible reference area of known relationship to the cross-sectional flow area of said conduit section and on which said magnified image is superimposed, whereby a selected constituent fraction may be estimated.

4. Acousto-optical apparatus for monitoring individual constituents of differing acoustical transparency in a multi-constituent flow within a conduit, comprising:

an acoustic source of given frequency and an acoustic wave coupler containing an acoustic wave transmission medium disposed in acoustically coupled relation with opposite sides of a section of said conduit;

said acoustic source being operable to transmit acoustic wave energy through said conduit section to said acoustic medium to produce in said medium distorted acoustic waves containing acoustic information representing the local constituents within said conduit section;

means for projecting a beam of monochromatic light through said acoustic medium in a manner such that said beam is modulated by said distorted acoustic waves to produce a selected light sideband defining an optical image of said local constituents;

means for magnifying said image; and means providing a visible reference area of known relationship to the cross-sectional flow area of said conduit section and on which said magnified image is superimposed, whereby a selected constituent fraction may be estimated.

5. Acousto-optical apparatus for monitoring individual constituents of differing acoustical transparency in a multi-constituent flow within a conduit, comprising:

a pair of acoustic sources of given frequency spaced circumferentially about and disposed in acoustically coupled relation with a section of said conduit;

a pair of acoustic wave couplers containing an acoustic wave transmission medium disposed in acoustically coupled relation to said conduit opposite said sources, respectively;

each acoustic source being operable to transmit acoustic wave energy through said conduit section to the opposing acoustic coupler to produce in its acoustic medium distorted acoustic means containing acoustic information representing the local constituents within said conduit section; and means for projecting a beam of monochromatic light through each acoustic medium in a manner such that said beam is modulated by the distorted acoustic waves in the respective medium to produce a selected light sideband defining an optical image of said local constituents.

6. Acousto-optical apparatus according to claim 5 including:

means for magnifying each image; and means providing a visible reference area of known relationship to the cross-sectional flow area of said conduit section and on which said magnified image is superimposed, whereby a selected constituent fraction may be estimated.

* * * * *